(12) United States Patent
Wereley et al.

(10) Patent No.: US 7,874,407 B2
(45) Date of Patent: Jan. 25, 2011

(54) SYSTEM AND METHOD FOR MAGNETORHEOLOGICAL-FLUID DAMPING UTILIZING POROUS MEDIA

(75) Inventors: Norman M. Wereley, Potomac, MD (US); Wei Hu, Rockville, MD (US); Eugene Cook, Boston, MA (US); Alan L. Browne, Grosse Pointe, MI (US)

(73) Assignees: University of Maryland, College Park, MD (US); GM Research & Development, Warren, MI (US)

( * ) Notice: Subject to any disclaimer, the term of this patent is extended or adjusted under 35 U.S.C. 154(b) by 811 days.

(21) Appl. No.: 11/818,582

(22) Filed: Jun. 15, 2007

(65) Prior Publication Data

US 2008/0023278 A1    Jan. 31, 2008

Related U.S. Application Data

(60) Provisional application No. 60/804,979, filed on Jun. 16, 2006.

(51) Int. Cl.
*F16F 9/53* (2006.01)
*F16F 15/03* (2006.01)

(52) U.S. Cl. .................................. 188/267.2; 188/267

(58) Field of Classification Search ................. 188/267, 188/267.1, 267.2; 137/909; 138/40, 41, 138/42
See application file for complete search history.

(56) References Cited

U.S. PATENT DOCUMENTS 1,021,677 A * 3/1912 Howell ........................ 138/40
1,457,059 A * 5/1923 Fregonara .................... 138/40

4,673,067 A    6/1987 Munning et al.

(Continued)

FOREIGN PATENT DOCUMENTS

DE    10226124 A1 *  8/2003

(Continued)

OTHER PUBLICATIONS

Shulman Z., "Magnetorheological systems and their application", Magnetic Fluids and Applications Handbook, pp. 188-229 (1996).

(Continued)

*Primary Examiner*—Thomas J Williams
(74) *Attorney, Agent, or Firm*—Carter, DeLuca, Farrell & Schmidt, LLP

(57) ABSTRACT

A magnetorheological fluid damping system includes a hydraulic cylinder, a piston head, a piston rod, and a porous valve. The hydraulic cylinder is configured for disposing magnetorheological fluid therein. The piston head is disposed within the hydraulic cylinder and has first and second sides defining first and second chambers within the hydraulic cylinder. The piston head is configured to be in sliding engagement with the hydraulic cylinder. The piston rod is connected to the piston head. The porous valve includes a magnetorheological fluid pathway, has first and second fluid connections, and is configured to dampen the flow of the magnetorheological fluid between the first and second fluid connections in accordance with a magnetic field. The first fluid connection is fluidly connected to the first chamber and the second fluid connection is fluidly connected to the second chamber. The magnetorheological fluid pathway at least partially directs magnetorheological fluid flow through a porous media.

41 Claims, 15 Drawing Sheetse

U.S. PATENT DOCUMENTS

| | | | | |
|---|---|---|---|---|
| 5,018,606 | A | * | 5/1991 | Carlson .................. 188/267.1 |
| 5,099,884 | A | | 3/1992 | Monahan |
| 5,277,281 | A | | 1/1994 | Carlson et al. |
| 5,878,851 | A | * | 3/1999 | Carlson et al. .............. 188/267 |
| 6,279,700 | B1 | | 8/2001 | Lisenker et al. |
| 6,311,810 | B1 | | 11/2001 | Hopkins et al. |
| 6,694,856 | B1 | | 2/2004 | Chen et al. |
| 6,802,404 | B1 | * | 10/2004 | Schurmans et al. ...... 188/267.1 |
| 6,953,108 | B2 | | 10/2005 | Anderfaas et al. |
| 7,051,849 | B2 | | 5/2006 | Browne et al. |
| 2001/0054527 | A1 | * | 12/2001 | Card ....................... 188/267.1 |
| 2004/0173422 | A1 | * | 9/2004 | Deshmukh et al. ....... 188/267.2 |
| 2005/0087409 | A1 | * | 4/2005 | Browne et al. ........... 188/267.2 |
| 2007/0017758 | A1 | * | 1/2007 | Or et al. .................. 188/267.2 |

FOREIGN PATENT DOCUMENTS

| | | | | |
|---|---|---|---|---|
| DE | 102004024226 | A1 | * | 12/2005 |
| GB | 2220725 | A | * | 1/1990 |
| JP | 08074915 | A | * | 3/1996 |
| WO | WO 2005/045279 | A | | 5/2005 |

OTHER PUBLICATIONS

Kuzhir et al., "Flow of magnetorheological fluid through porous media", Euro J. Mech. B/Fluids 22, pp. 331-343 (2003).

Cho et al., "Smart passive system based on magnetorheological damper", Smart Mater. Struct., vol. 14, pp. 707-714 (2005).

Lesieutre et al., "Damping as a result of piezoelectric energy harvesting", Journ. of Sound and Vibration, vol. 269, pp. 991-1001 (2004).

Scruggs et al., "Control of a Civil Structure Using an Electric Machine with Semiactive Capability", Journ. of Str. Eng., pp. 951-959 (Jul. 2003).

Breese et al., "Semi-Active, Fail-Safe Magneto-Rheological Fluid Dampers for Mountain Bicycles", Intnl. J. Vehicle Design, in press (2003).

Yang et al., "Large-scale MR fluid dampers: modeling and dynamic performance considerations", Eng. Struc., vol. 24, pp. 309-323 (2002).

Choi et al., "Semi-Active Vibration Isolation Using Magnetorheological Isolators", Journ. of Aircraft, vol. 42, No. 5, pp. 1244-1251 (2005).

Hiemenz et al., "Seismic Control of Civil Structures Utilizing Semi-Active MR Braces", Computer-Aided Civil and Infr. Eng, vol. 18, pp. 31-44 (2003).

Skaar et al., "Slotless, Toroidal Wound, Axially-Magnetized Permanent Magnet Generator for Small Wind Turbine Systems", Norwegian Univ. of Sc. and Tech.

Kamath et al., "Characterization of Magnetorheological Helicopter Lag Dampers", SPIE's 5th Ann. Sym. on Smart Str. and Mat., San Diego, CA, 1-5 (Mar. 1998).

Graves et al., "Theoretical Comparison of Motional and Transformer EMF Device Damping Efficiency", Journ. of Sound and Vibration, vol. 233(3), pp. 441-453 (2000).

PCT International Search Report for PCT/US2007/014193 dated Nov. 28, 2007.

Choi et al., "Comparative Analysis of the Time Response of Electrorheological and Magnetorheological Dampers Using Nondimensional Parameters", J. of Int. Mat. Sys. and Str., vol. 13, pp. 443-451 (2002).

Carlson, J.D., "What Makes a Good MR Fluid?", Journal of Intel. Mat. Systems and Structure, 13(7-8):431-435 (2002).

Choi et al., "Biodynamic Response to Shock Loads Using Magnetorheological Helicopter Crew Seat Suspensions", AIAA J. Aircraft, 42(5);1288-1295 (2005b).

Dong et al., "Smart Rehabilitation Devices: Pt. I-Force Tracking Control", J. of Intelligent Mat. Sys. and Struc., 17(7):543-552 (2006a).

Dong et al., "Smart Rehabilitation Devices: Pt. II-Adaptive Motion Control", J. of Intelligent Material Sys. and Struc., 17(7):555-561 (2006b).

Duan et al., "Cable Vibration Using Magnetorheological Dampers", Journ. of Intelligent Material Syst. and Struc., 17(4):321-325 (2006).

Facey et al., "Design and Testing of a Compact Magnetorheological Impact Damper for High Impulsive Loads", Intl. J. of Modern Physics Part B., 19(7-9):1549-1555 (2005).

Lindler et al., "Analysis and Testing of Electrorheological Bypass Dampers", Journ. of Intelligent Mat. Syst. and Struc., 10(5):363-376 (1999).

* cited by examiner

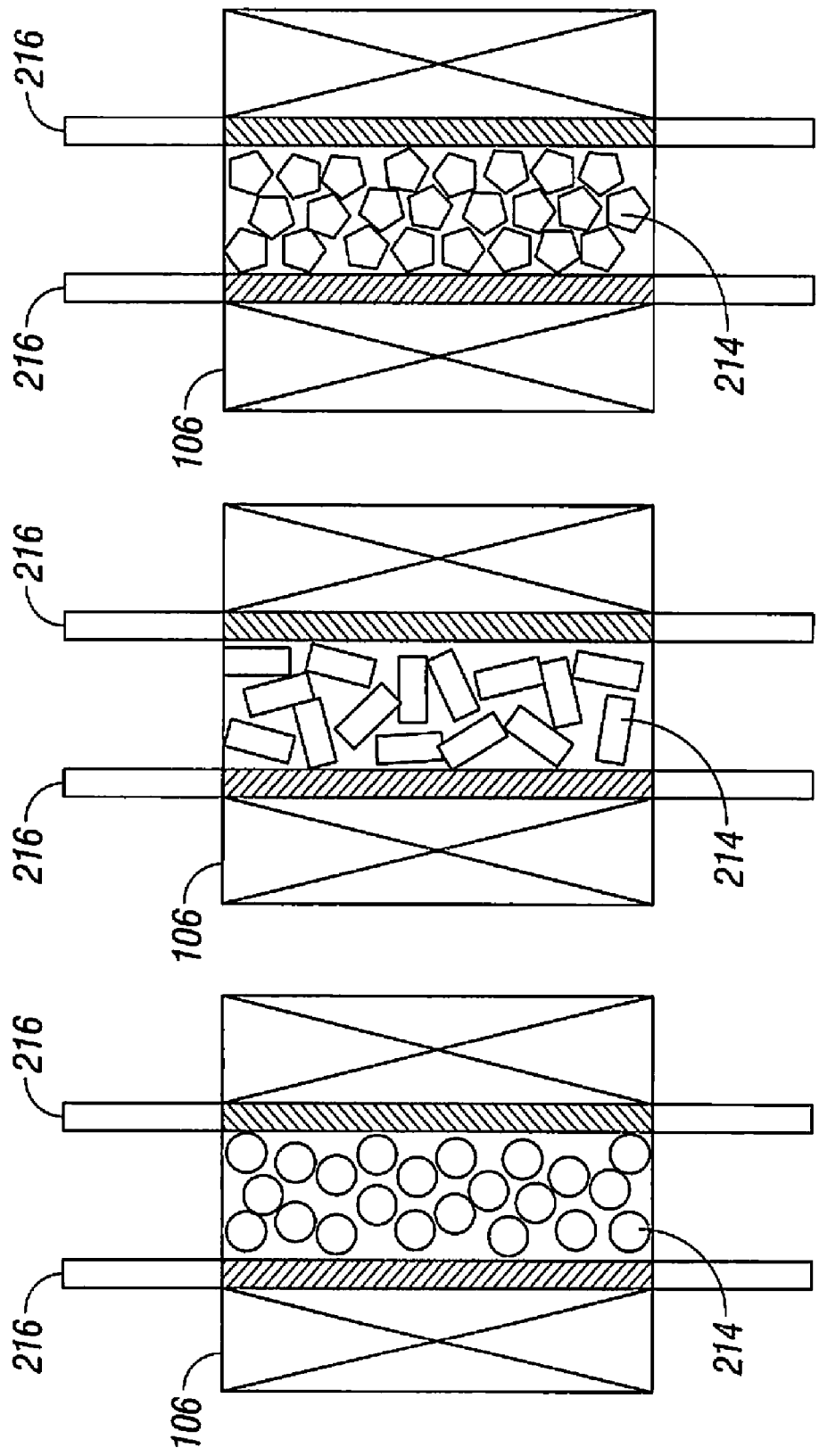

SYSTEM AND METHOD FOR
MAGNETORHEOLOGICAL-FLUID
DAMPING UTILIZING POROUS MEDIA

PRIORITY CLAIM TO PROVISIONAL
APPLICATION

This claims priority to and the benefit of U.S. Provisional Patent Application No. 60/804,979, filed in the U.S. Patent and Trademark Office on Jun. 16, 2006, entitled "Damper Exploiting Flow through a Magnetorheological Valve Filled with a Porous Media", the entire contents thereof is incorporated herein by reference in its entirety.

BACKGROUND

1. Technical Field

The present disclosure relates to magnetorheological fluid damping, and, in particular, to a system and method for magnetorheological-fluid damping utilizing porous media.

2. Description of Related Art

Generally, magnetorheological fluids (herein referred to as "MR" fluids) are a class of fluids that change in viscosity in the presence of a magnetic field. An MR fluid may have the viscosity of commercially available motor oil when no magnetic field is present and may behave similarly to a solid when a magnetic field is applied (e.g., it may become a viscoelastic solid). Therefore, they exhibit controllable yield strength. When no magnetic field is present, MR fluids may be sufficiently modeled as Newtonian liquids. These unique properties make the material ideal for mechanical vibration damping because of the ability to utilize a magnetic field to control the viscosity of the MR fluid. Additionally, some MR fluids have a response time of less than 10 milliseconds making it well suited for mechanical vibration damping systems.

MR fluid dampers are emerging as a promising technology for semi-active damping control. They have been widely applied to control and suppress unwanted mechanical vibrations and shock of various systems and structures because of their inherent advantages. Such advantages include its ability to assist in continuously controlling force, its fast response time, and its relatively small power consumption. Some mechanical vibration and shock mitigation systems that utilize MR fluid dampers include either a power supply and/or a current amplifier.

Many MR fluid damping systems include a hydraulic cylinder containing MR fluid, and a piston head adapted for movement within the housing. The piston head and/or hydraulic cylinder may be formed from one or more materials including ferrous metal. Additionally, the piston head may be designed to contain and/or connect to several windings of conductive wire forming a magnetic coil. For example, a magnetic coil may be embedded inside the piston head or wrapped around the piston head. Magnetic coils may be in the shape of a solenoid (sometimes referred to as "a solenoid" or "a coil"). The magnetic coil may generate a magnetic field in and around the piston to affect the MR fluid. Descriptions of various MR dampers can be found in U.S. Pat. No. 5,277,281 to J. D. Carlson et al., U.S. Pat. No. 6,279,700 to I. Lisenker et al., U.S. Pat. No. 6,311,810 to P. N. Hopkins et al., U.S. Pat. No. 6,694,856 to P. C. Chen and N. M. Wereley, and U.S. Pat. No. 6,953,108 to E. N. Anderfaas and D. Banks. In these MR damper configurations, the MR fluid pathways move with the piston (U.S. Pat. Nos. 5,277,281, 6,279,700, 6,311,810, and 6,953,108) or are fixed relative to the damper body (U.S. Pat. No. 6,694,856). The MR fluid pathways are straight or in rectilinear simple geometry shapes and are configured to be perpendicular to the magnetic field.

There has been a modern trend towards miniaturization of MR fluid valves. This trend has imposed some design constraints on the overall design of MR fluid damping systems. One MR fluid valve configuration uses tortuous channels that naturally exist in porous media, e.g., as described in the reference Shulman Z., Magnetorheological systems and their application, Magnetic Fluids and Applications Handbook (1996) pp. 188-229. This reference proposes spiral channels or packed beds of particles as flow channels placed inside a solenoid. Kuzhir et al. developed a hydraulic device for the investigation of MR fluid flow through porous media in the presence of a magnetic field parallel to the flow. (see Kuzhir P., Bossis G., Bashtovoi V. and Volkova O., Flow of magnetorheological fluid through porous media, Euro. J. Mech. B/Fluids 22 (2003) pp. 331-343) Their measurements demonstrated that a packed bed of magnetic grains had a higher controllable damping range than spiral channels. There is a continuing need for efficient and effective MR fluid damping systems utilizing MR fluid valves to control the flow of MR fluid.

SUMMARY

The present disclosure relates to magnetorheological fluid damping, and, in particular, to a system and method for magnetorheological-fluid damping utilizing porous media.

It is an aspect of the present disclosure to provide an active length of an MR fluid pathway in an MR fluid valve that may be increased without significant detriment to the overall performance of an MR fluid damping system. It is yet another aspect of the present disclosure to provide a valve that can be activated by a magnetic coil that is effective and efficient at dissipating the thermal energy generated by resistance of the MR fluid. It is yet another aspect of the present disclosure to provide an MR fluid damping system with effective and efficient mechanical vibration damping over a sufficient range of mechanical amplitudes and frequencies. Not all embodiments address all aspects and some embodiments may address none. Other aspects and/or advantages are made apparent by referencing the claims in light of the disclosure.

In one aspect thereof, the present disclosure includes a magnetorheological fluid damping system including a hydraulic cylinder, a piston head, a piston rod, and a porous valve. The hydraulic cylinder may have partially disposed magnetorheological fluid therein and includes first and second ends. A diaphragm may be disposed in the hydraulic cylinder forming an accumulator.

The piston head is disposed within the hydraulic cylinder and has first and second sides. The piston head defines first and second chambers within the hydraulic cylinder. The first chamber being adjacent to the first side of the piston head; the second chamber being adjacent to the second side of the piston head. And the piston head is configured to be in sliding engagement with the hydraulic cylinder.

The piston rod is at least partially disposed within the hydraulic cylinder through the first side of the hydraulic cylinder and is operatively connected to the piston head on the first side.

In another aspect thereof, the porous valve includes at least one magnetorheological fluid pathway and includes first and second fluid connections. Also, the porous value is configured to dampen the flow of the magnetorheological fluid between the first and second fluid connections in accordance with a magnetic field. The first fluid connection is fluidly connected to the first chamber and the second fluid connection is fluidly connected to the second chamber. The at least one magnetorheological fluid pathway is configured to at least partially direct the magnetorheological fluid flow through a porous media. The porous valve may be a bypass porous valve.

In another aspect thereof, the at least one magnetorheological fluid pathway may include a nonmagnetic tube configured for at least partially disposing the porous media therein. The porous media may include spherical beads, cylindrical columns, irregular cylinders, irregular columns, arrays of hollow cylinders, straight geometry arrays of hollow cylinders, circuitous geometry arrays of hollow cylinders, flakes, irregular shapes, flat plates with holes aligned perpendicular to the flow of the magnetorheological fluid, open cell foams, cellular structures, lattice structures, fibers, a columnar array, carbon nanofibers, carbon tubes, a shape memory alloy, and/or combination thereof. The porous media may be metallic and/or nonmetallic. A magnetic coil may be used to generate the magnetic field at least partially through the porous media.

In another aspect thereof, the hydraulic cylinder may include an inner wall and an outer wall. At least one magnetorheological fluid pathway may be at least partially disposed adjacent to the inner wall of the hydraulic cylinder. Additionally or alternatively, the at least one magnetorheological fluid pathway may be at least partially disposed within the piston head.

In another aspect thereof, a porous valve includes a magnetorheological fluid pathway, and a magnetic coil. The magnetorheological fluid pathway may include a tube with porous media partially disposed therein. The tube defines first and second ends. Also, the magnetic coil forms an approximate cylinder shape. The tube is at least partially disposed within the magnetic coil.

In another aspect thereof, the porous valve may include first and second fluid connections. The first fluid connection is operatively secured to a first end of a tube, and the second fluid connection is operatively secured to a second end of a tube. The first fluid connection may form an internally threaded region configured to house at least one nylon washer and a mesh. The at least one nylon washer can secure the mesh. And the first fluid connection may be further configured for receiving a hollow set hex screw.

Additionally or alternatively, the first fluid connection may be configured to receive a securing member and secure the porous media. Similarly, the second fluid connection may form an internally threaded region configured to house at least one nylon washer and a mesh. The at least one nylon washer can secure the mesh. The second fluid connection may be further configured for receiving a hollow set hex screw. Additionally or alternatively, the second fluid connection may be configured to receive a securing member and secure the porous media.

In another aspect thereof, a tube included in an MR fluid pathway may be a nonmagnetic tube and/or the porous media contained therein may include one or more nonmagnetic stainless steel spheres or magnetic steel spheres. Also, a magnetic coil may be included that is a copper magnetic coil configured to affect MR fluid. A current source may be connected to the magnet coil and may supply electric current to the magnetic coil to generate the magnetic field.

In another aspect thereof, a method for dampening mechanical vibrations is disclosed that include the steps of: (1) providing a magnetorheological fluid damping system, and (2) adjusting the magnetic field for dampening mechanical vibrations. The magnetorheological fluid damping system may be any one of the ones described herein. The step of adjusting the magnetic field for dampening mechanical vibrations may include varying a load-stroke profile of the magnetorheological fluid damping system, e.g., when the mechanical vibrations include a shock load and/or a short duration impulsive load In another aspect thereof a method for controlling a porous valve is disclosed and may include the steps of (1) providing a porous valve, and (2) controlling a current source operatively connected to a magnetic coil in the porous valve. The current source supplies electric current to the magnetic coil to generate a magnetic field. The porous valve may be any porous value described herein.

In another aspect thereof, a magnetorheological fluid damping system is disclosed that includes a means for providing a hydraulic cylinder with a piston head disposed therein. The piston head defines first and second chambers. And the damping system further includes a means for directing the flow of magnetorheological fluid through a porous valve. The porous valve includes at least one magnetorheological fluid pathway. The porous valve includes first and second fluid connections. The first fluid connection is fluidly connected to the first chamber; and the second fluid connection is fluidly connected to the second chamber. The at least one magnetorheological fluid pathway is configured to at least partially direct the magnetorheological fluid flow through a porous media. The system also includes a means for controlling a magnetic field at least partially affecting the magnetorheological fluid flowing through the porous media.

In another aspect thereof, a porous valve is disclosed that includes a means for directing magnetorheological fluid through a porous media, and a means for generating a magnetic field to affect the magnetorheological fluid flowing through the porous media.

BRIEF DESCRIPTION OF THE DRAWINGS

These and other advantages will become more apparent from the following detailed description of the various embodiments of the present disclosure with reference to the drawings wherein:

FIGS. 4A, 4B, and 4C are cross-sectional graphics of several porous valves with differing porous media in accordance with the present disclosure;

DETAILED DESCRIPTION

Figure 1A:
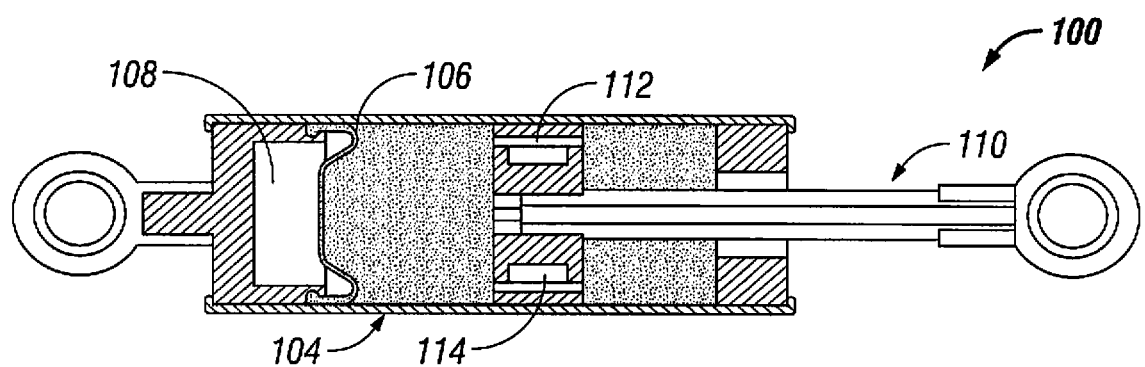
FIG. 1A is a cross-sectional view of a prior art MR fluid damper using flow channels.
Figure 1B:
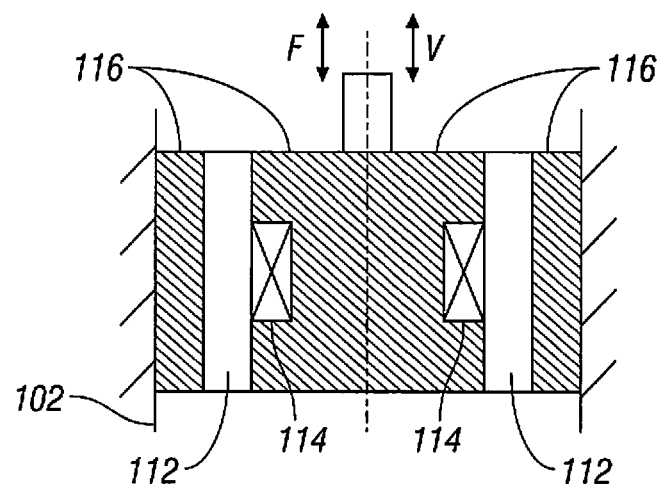
FIG. 1B is a cross-sectional view of the piston head of the MR fluid damper of FIG. 1A.

Referring simultaneously to drawings FIGS. 1A and 1B; FIG. 1A shows a cross-sectional view of a prior art MR fluid damper 100 and FIG. 1B shows an enlarged view of piston head 102 of FIG. 1A. Damper 100 includes hydraulic cylinder 104. Note that diaphragm 106 forms accumulator 108. Accumulator 108 provides compensation for the movement of piston rod 110 as it slides through hydraulic cylinder 104. Flow channels 112 are shown with magnetic coil 114 positioned in piston head 102. Note that magnetic material 116 provides for a magnetic flux return. Additionally, magnetic coil 114 is immersed in MR fluid, which may wear on magnetic coil 114 if not properly designed. The thermal characteristics of damper 100 may provide sufficient heat dissipation from the heat generated therein, including the heat generated by magnetic coil 114. Moreover, the aggregate volume of magnetic coil 114 may result in designs that have a reduced active length for fluid channels 112, and impose additional constrains on the dimensions of fluid channels 112 and the magnetic material 116 so that specific criteria regarding the magnetic flux return has proper magnetic field saturation and precise return path width.

Figure 2:
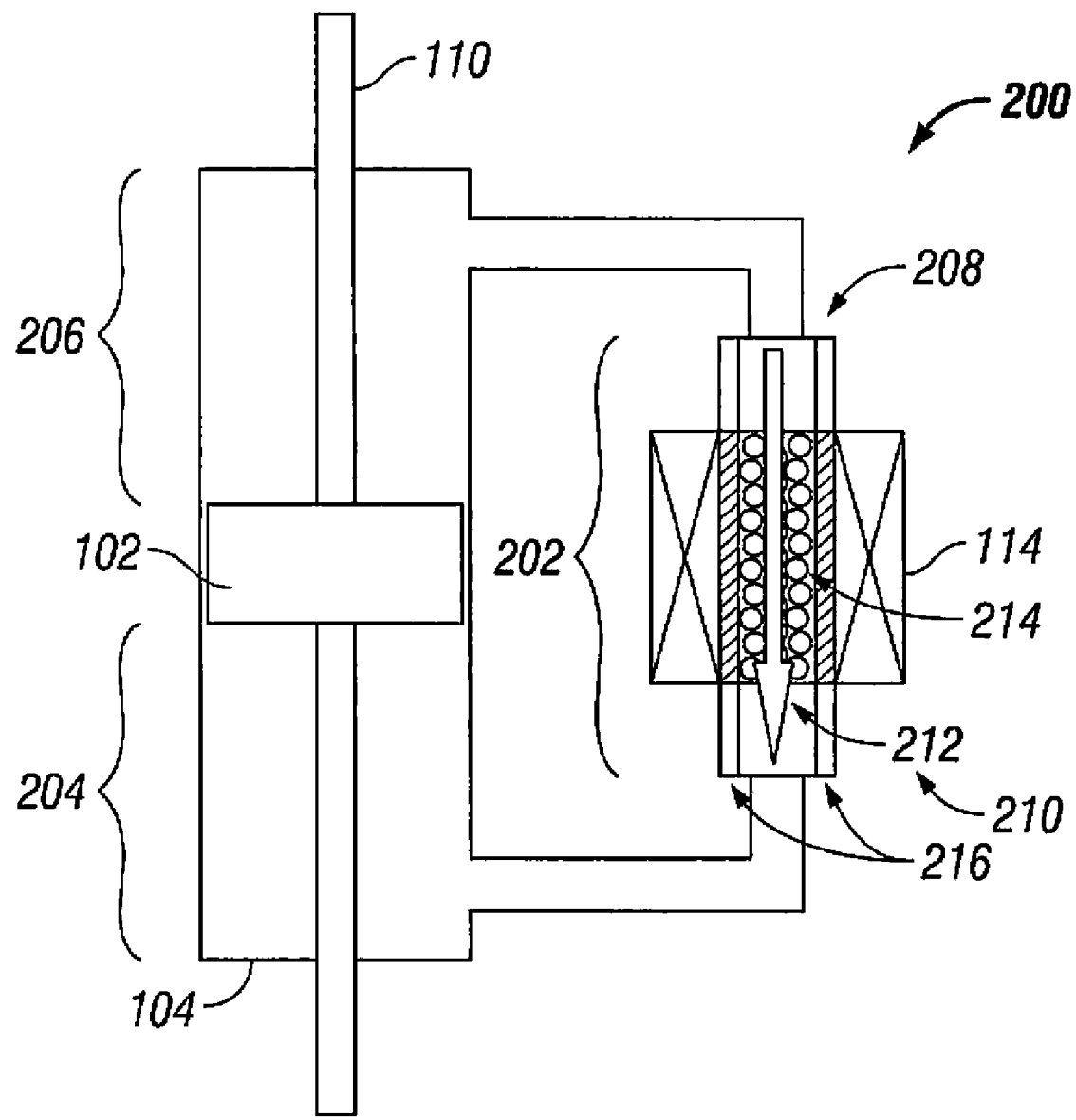
FIG. 2 is a schematic of an MR fluid damping system that includes a bypass porous valve in accordance with the present disclosure.

Referring to FIG. 2, schematic of MR fluid damping system 200 that includes bypass porous valve 202 that includes hydraulic cylinder 104 that has chambers 204 and 206 defined by piston head 102. Piston rod 110 extends through hydraulic cylinder 104 and is attached to piston head 102. Additionally or alternatively, piston rod 110 as shown in FIG. 2 may be described as two separate piston rods each attached to a differing side of piston head 102. Herein, the describing a single piston rod going through a piston head being attached to the piston head is considered equivalent to two piston rods being operatively attached to the two side of a piston head. The chamber 206 is fluidly connected to bypass porous valve 202 via fluid connection 208 while chamber 204 is fluidly connected to bypass porous valve 202 via fluid connection 210. The bypass porous valve 202 includes MR fluid pathway 212, magnetic coil 114 formed around a portion MR fluid pathway 212 and around tube 216. Within tube 216 porous media 214 is contained therein which may include multiple spherical beads and/or other fillers are randomly or orderly packed inside an MR fluid pathway 212. Magnetic coil 114 is wrapped around tube 216 and may include a steel tube that is stationary to hydraulic cylinder 104. MR fluid connections 208 and 210 are used to connect bypass porous valve 202 to hydraulic cylinder 104.

A feature of some embodiments of bypass porous valve 202 is that both MR fluid and porous media 214 are placed in the center magnetic coil 114 and may be designed to function as a magnetic flux guide. Natural tortuous fluid channels exist in porous media 214 thus allowing non-unidirectional flow of MR fluid through bypass porous valve 202 resulting in magnetic field with varying orientations relative to the velocity of the MR fluid. In such a configuration, mean values of the magnetic field applied to the MR fluid depend on material properties and geometry shape of porous media 214 resulting in flexible design requirements of bypass porous valve 202. Comparatively, in some flow mode MR dampers, a fluid channel must be configured to convey MR fluid perpendicularly to a magnetic field, which places numerous geometry constraints on damper and magnetic coil design and also increases damper cost.

Additionally or alternatively, bypass porous valve 202 may improve damper efficiency and effectiveness because of the natural tortuous fluid channels existing in porous media 214. This natural consequence allows for the aggregate fluid channel length to be easily increased by the curvedness found in porous media 214. Also, yield and viscosity behavior of the MR fluid can be affected by the applied magnetic field as the consequence of the resulting capillary style of MR fluid pathway 212. By using tortuous paths, the magnetic field and flow paths can be oriented at an angle thereby improving the activation efficiency of the MR fluid yield stress.

As piston rod 110 moves relative to hydraulic cylinder 104, piston head 102 pushes the MR fluid from, for example, chamber 206 into fluid connection 208 of bypass porous valve 202 along MR fluid pathway 212 and at least partially through tube 216. This pushes MR fluid through porous media 214 that may be affected by a magnetic field generated by magnetic coil 114. The MR fluid then exits bypass porous valve 202 through fluid connection 210 and enters chamber 204. As a result, when piston head 102 moves, the MR fluid must pass through bypass porous valve 202 where the yield stress and viscosity of the MR fluid therein may be controlled by a magnetic field generated by magnetic coil 114. The result is that MR fluid system 200 is controllable by an electric current supplied by a current source (not shown).

Figure 3A:
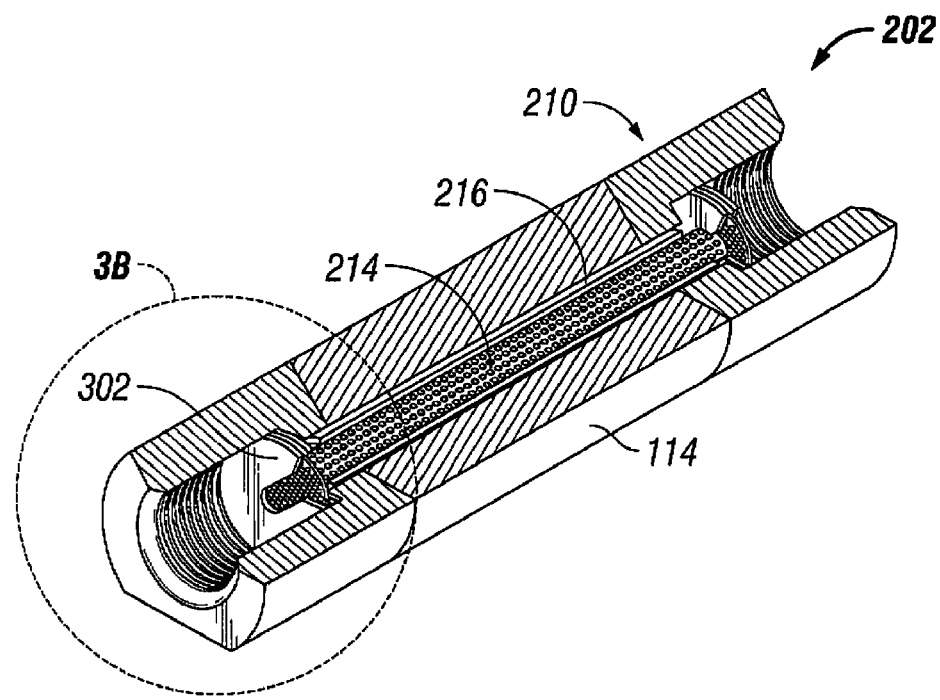
FIG. 3A is a three-dimensional graphic of a bypass porous valve in accordance with the present disclosure.
Figure 3B:
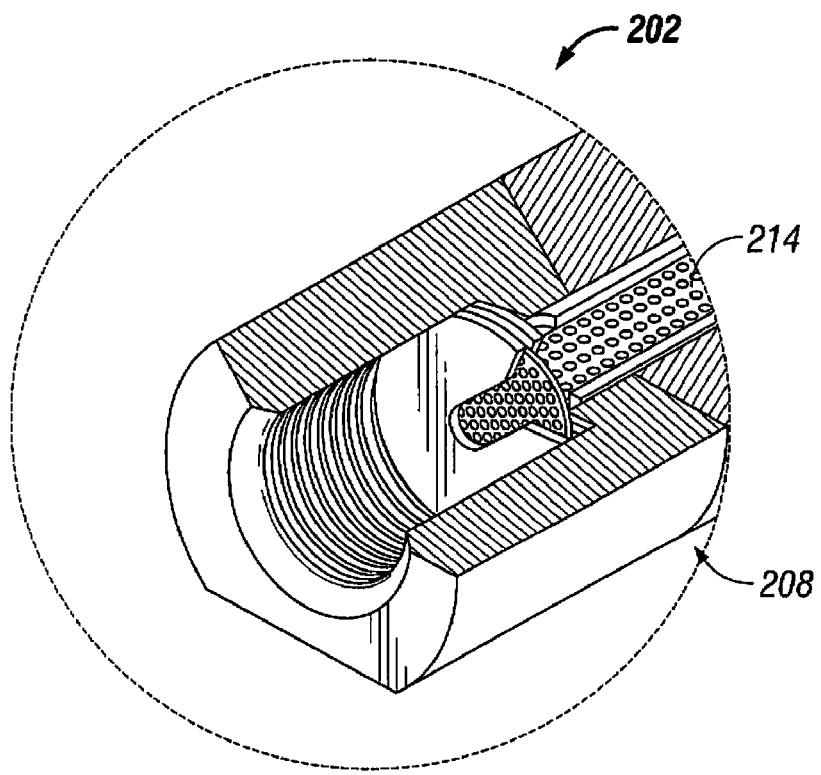
FIG. 3B is a three-dimensional graphic of a portion of the porous valve of FIG. 3A in accordance with the present disclosure.

Referring to FIG. 3, in a detailed 3-D perspective view of bypass porous valve 202, the porous media 214 is depicted as spherical beads disposed in tube 216 which are constrained by screw and washer set 302 at fluid connections 208 and 210. Instead of spherical beads, tube 216 may be filled with various filler media according to damper performance requirements.

Referring to FIGS. 4A-4C, porous media 216 is shown within tube 216 that include multiple particles having varying geometries. Spherical beads are included in porous media 214 in FIG. 4*a*; cylindrical columns are shown as included in porous media 214 in FIG. 4*b*; and irregular cylinders are depicted to be included in porous media 214 in FIG. 4*c*. However, porous media 214 may be arrays of hollow cylinders of either straight or circuitous geometries, bundled such arrays with various degrees of packing, non-bundled such arrays, flakes or other irregular shapes and any mixture of these particles where the mixture is based on morphology (shape), scale (size). A porous media 214 may include one or more flat plates of arbitrary thickness aligned perpendicular to the flow each with one or more holes the holes in consecutive plates having varying degrees of overlap with arbitrary spacing between the consecutive plates. Porous media 214 may include metallic and/or nonmetallic particles in various additional geometrical arrangements/forms, including but not limited to open-cell foams, cellular structures such as what might be produced by sintering or lost foam casting, lattice structures, randomly or non-randomly oriented fiber or other columnar arrays (such as carbon nanofibers or tubes) that are sufficiently strong to not be compressed during damper operation. Also materials may be included in porous media 214 that can be deformed elastically during damper operation but sufficiently strong so as to not be permanently deformed, i.e. deformed plastically during damper operation. Porous media 214 can also be, at least in part, a shape memory alloy, the shape memory properties being utilized in either thermally or stress activated modes to effect controllable, and, depending on the arrangement, reversible changes in the geometry and arrangement of the filler material. The porosity of the porous media 214 varies according to a required viscous damping and/or controllable damping range. In addition, the magnetic property of the porous media 214 is dependent on the material, and may be magnetic or nonmagnetic.

As mentioned above, the flow of the MR fluid through porous valves disclosed herein is equivalent to MR flowing through multiple tortuous channels connecting the pores in the filler media.

Figure 5:
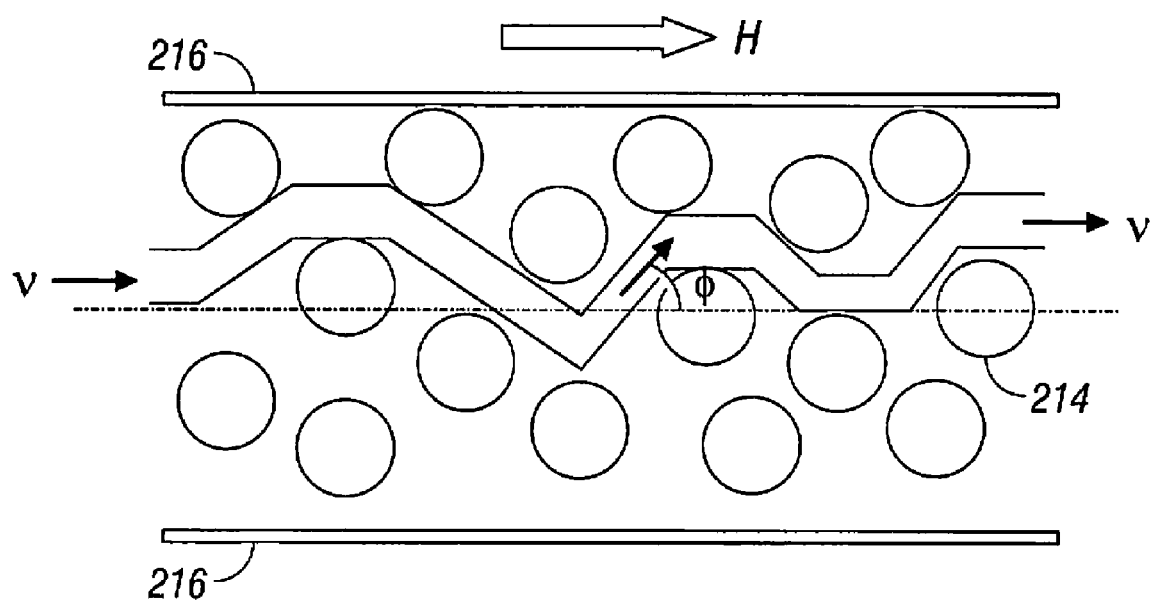
FIG. 5 is a cross-sectional view of an MR fluid pathway with a tube with porous media disposed therein, in accordance with the present disclosure.

Referring to FIG. 5, tube 216 is illustrated with a magnetic field parallel to the axis. At each point along tube 216, the inclined angle between the axis and magnetic field direction is varied and stochastically the average angle of the channel relative to the magnetic field is a function of the tortuosity of porous media 214. As the tortuosity increases, the active length of the tortuous channel increases leading to a larger controllable damping range of the damper.

Figure 6:
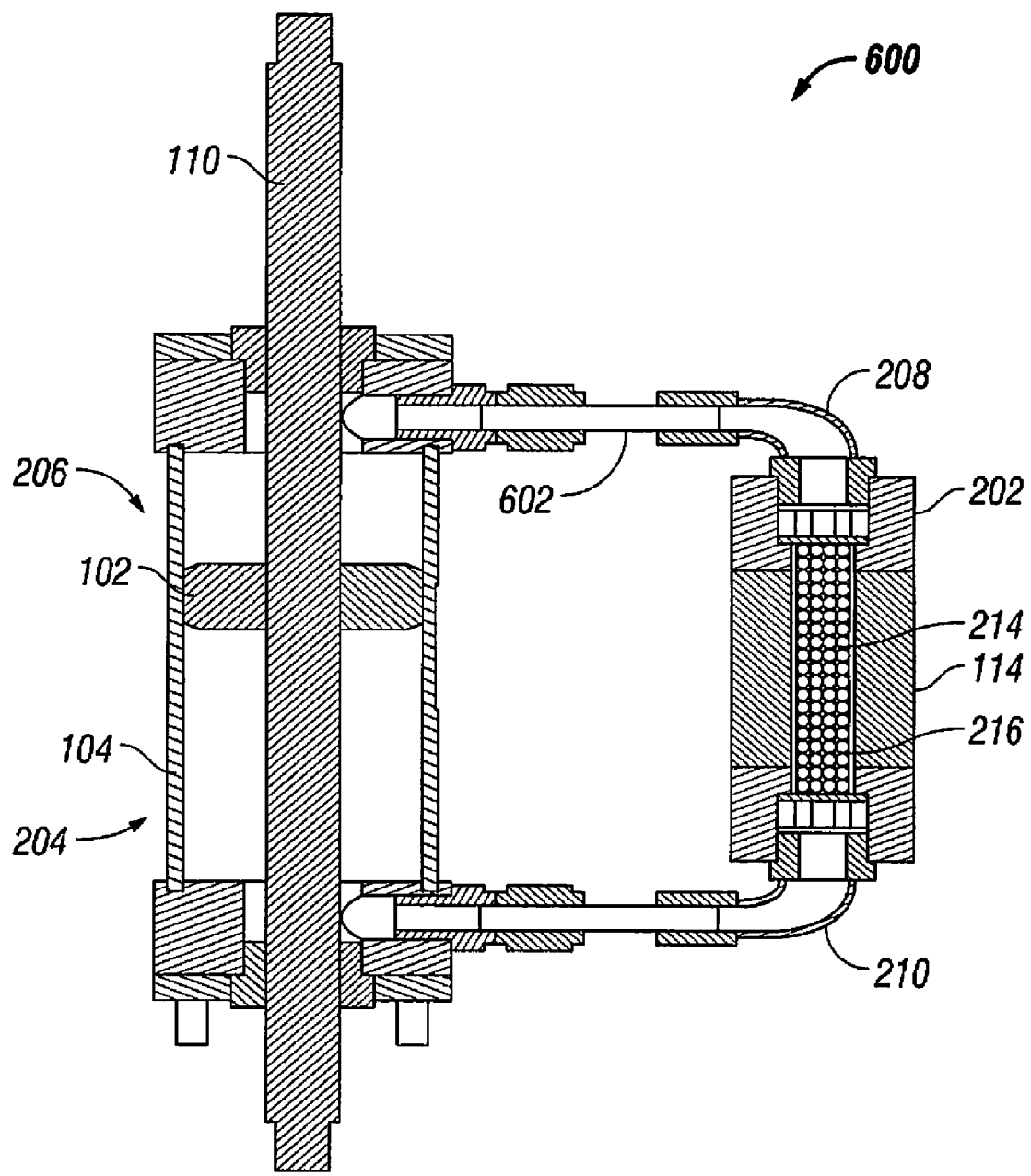
FIG. 6 is a cross-sectional view of an MR fluid damping system with a bypass porous valve, the piston head having piston rods connected to both sides, in accordance with the present disclosure.

Referring to FIG. 6, MR fluid damping system 600 is shown that includes piston rod 110 that is through hydraulic cylinder 104. Additionally bypass porous valve 202 is shown. Consider a particular example where hydraulic cylinder 104 has a 2 inch bore and a 6 inch stroke which may compress the MR fluid contained therein. Piston head 102 in hydraulic cylinder 104 defines chambers 204 and 206. Piston rod 110 goes wholly through hydraulic cylinder 104 thus mitigating the need to include a diaphragm forming an accumulator. Any necessary seals may be standard hydrocarbon fluid seals that are compatible with MR fluids. Bypass porous valve 202 is mounted to hydraulic cylinder 104 via fluid connections 208 and 210. The connections from bypass porous valve may be done via stainless steel tubes 602. When piston head 102 moves, the MR fluid is operatively forced through bypass porous valve 202, where a magnetic field is generated by magnetic coil 114, thus damping the MR fluid flow.

Figure 7:
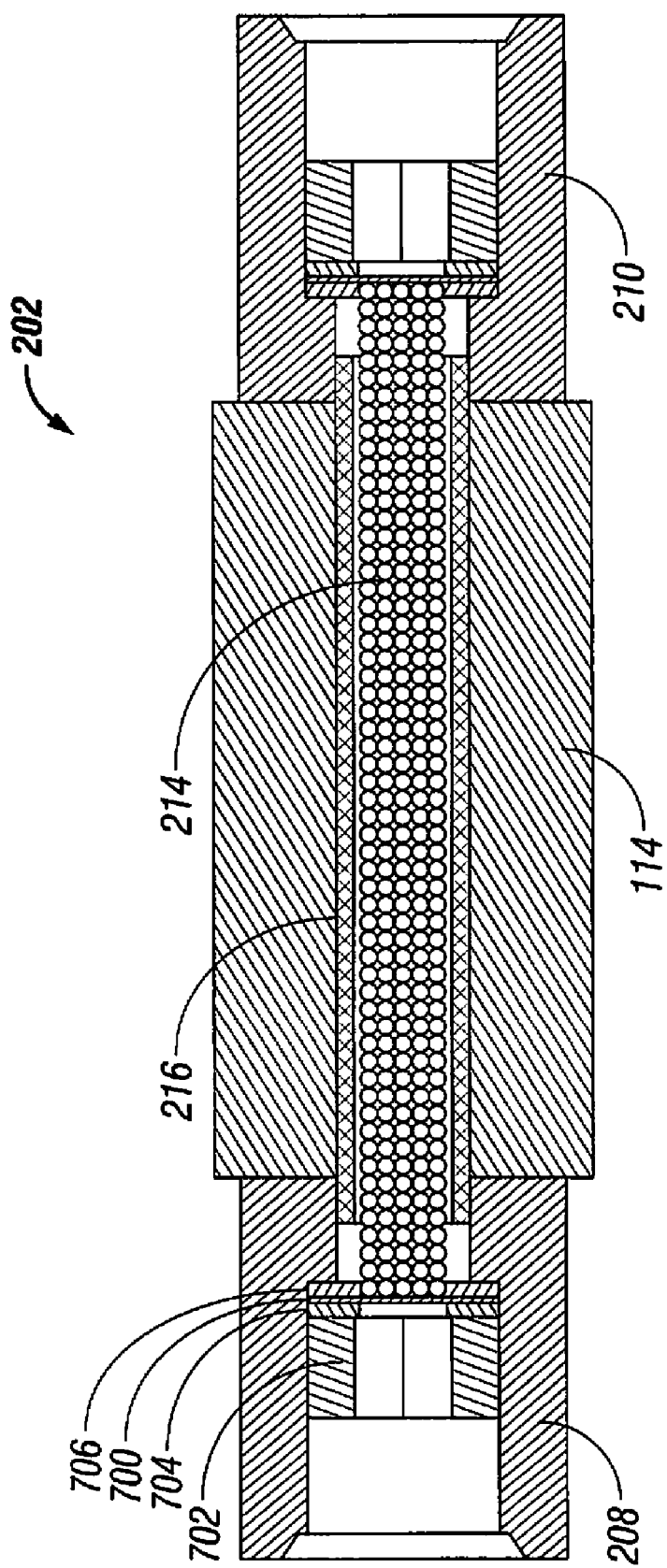
FIG. 7 is a cross-sectional view of a bypass porous valve in accordance with the present disclosure.

Referring to the drawings, FIG. 7 shows a cross-sectional view of bypass porous valve 202. Bypass porous valve 202 include tube 216 which may be made of non-magnetic stainless steel, fluid connections 208 and 210, porous media 214, magnetic coil 114. Magnetic coil 114 may have 50 Ohms of resistance is disposed around the outside of the tube 216 that can generate a magnetic field parallel to the flow of an MR fluid. Additionally or alternatively, magnetic coil 114 may be made of copper. Tube 216 may be made of a non-magnetic material in order to encourage the magnetic field to be stronger within the MR fluid rather than tube 216 itself. Fluid connections 208 and 210 may be made of magnetic steel to reduce the reluctance to the MR fluid. Contained within tube 216 is porous media 214 that may include packed magnetic stainless steel spheres on the order of several millimeters in diameter. These spheres form the tortuous channels that the MR fluid may flow through. The narrowness of these channels, along with the variation in their orientation relative to the magnetic field direction, allows the bypass porous valve 202 to achieve a strong resistance to flow despite the fact that the magnetic field is oriented parallel to the overall MR fluid flow direction. The spheres are secured in tube 216 near fluid connection 208 by a steel mesh 700. Fluid connection 208 may be configured receive hollow set hex screw to be tightened down onto steel mesh 700 via nylon washers 704 and 706. Hollow set hex screw 702 may be hollowed in a hex shape, allowing MR fluid to pass through without restriction.

Figure 8:
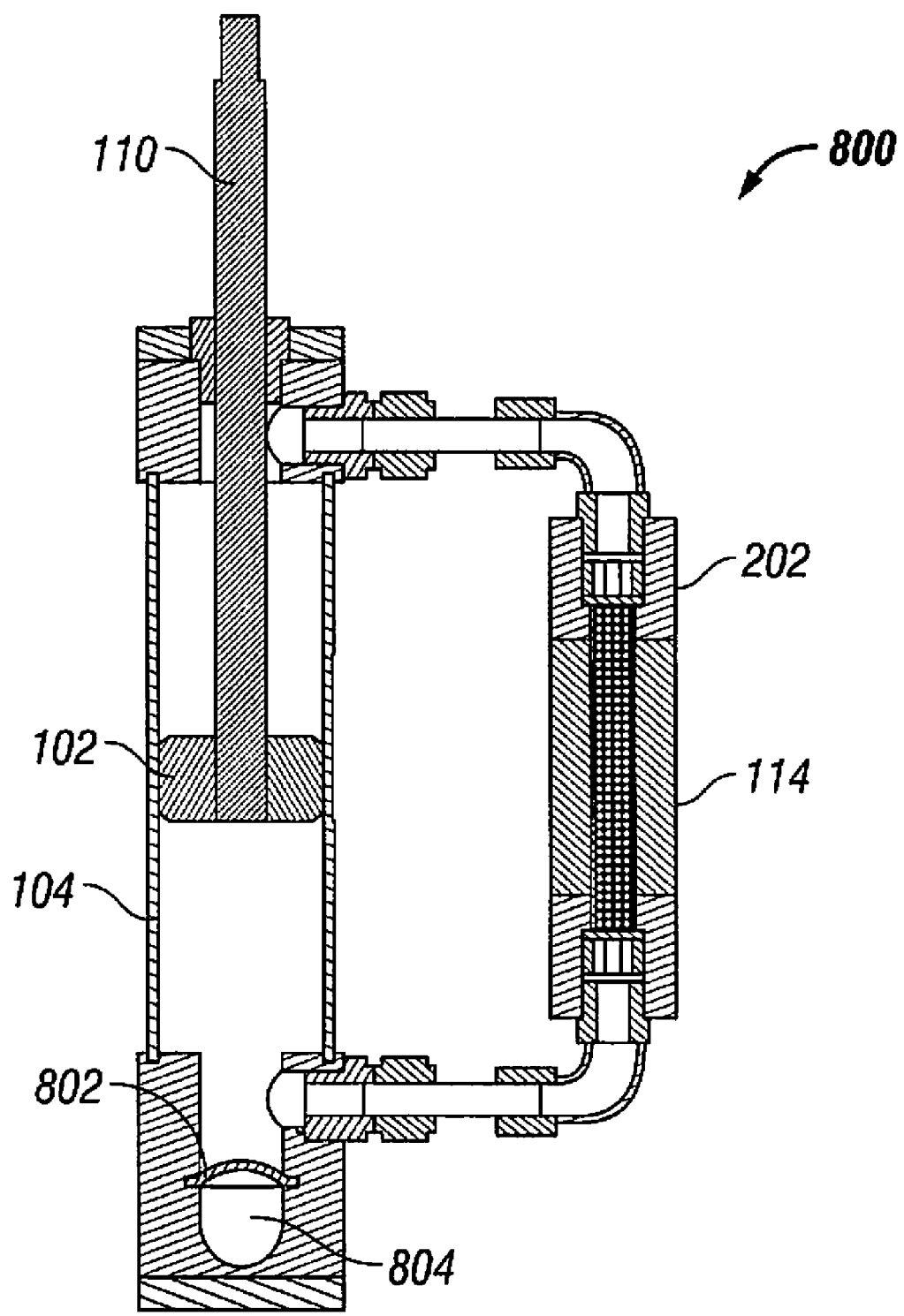
FIG. 8 is a cross-sectional view of an MR fluid damping system with a bypass valve, the piston head having a piston rod connected to a first side, the hydraulic cylinder has a diaphragm which is included and forms an accumulator, in accordance with the present disclosure.

Referring to FIG. 8, MR fluid damping system 800 with a bypass porous valve 202 is shown. Note that piston rod 110 does not extend through piston head 102 out the other side of hydraulic cylinder 104. Rather diaphragm 802 is included to form accumulator 804 which allows for volumetric compensation as piston rod 110 slides in and out of hydraulic cylinder 104. Accumulator may contain a gas, a compressible fluid, a non-compressible fluid, necessary seals and gaskets, and/or some combination thereof.

Figure 9:
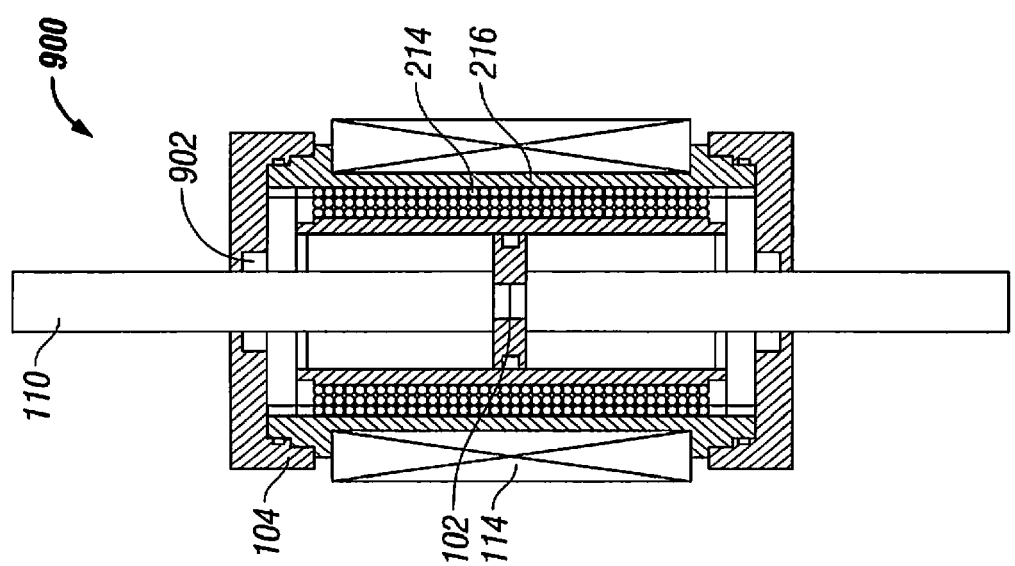
FIG. 9 is a cross-sectional view of an MR fluid damping system with a hydraulic cylinder, an MR fluid pathway is partially disposed on the inner wall of the hydraulic cylinder in accordance with the present disclosure.

Referring to drawings, FIG. 9 shows cross-sectional view of an MR fluid damping system 900 with a hydraulic cylinder 104, an MR fluid pathway is partially disposed on the inner wall of the hydraulic cylinder 104. Porous media 214 is sandwiched between the inner wall of hydraulic cylinder 104 and tube 216 forming a porous valve. Note that system 900 does not include a bypass porous value as discussed supra. Also note that piston rod 110 passes through piston head 102. U-cups 902 and 904 and are shown and may use standard hydrocarbon fluid seals, compatible with many MR fluids. Magnetic coil 114 is wrapped around outer wall of hydraulic cylinder 104 such that the sandwiched porous media 214 becomes a center magnetic flux path. Hydraulic cylinder 104 and tube 216 may be made of non-magnetic stainless steel to encourage most of the magnetic field through porous media 214 rather than through metal components.

Figure 10:
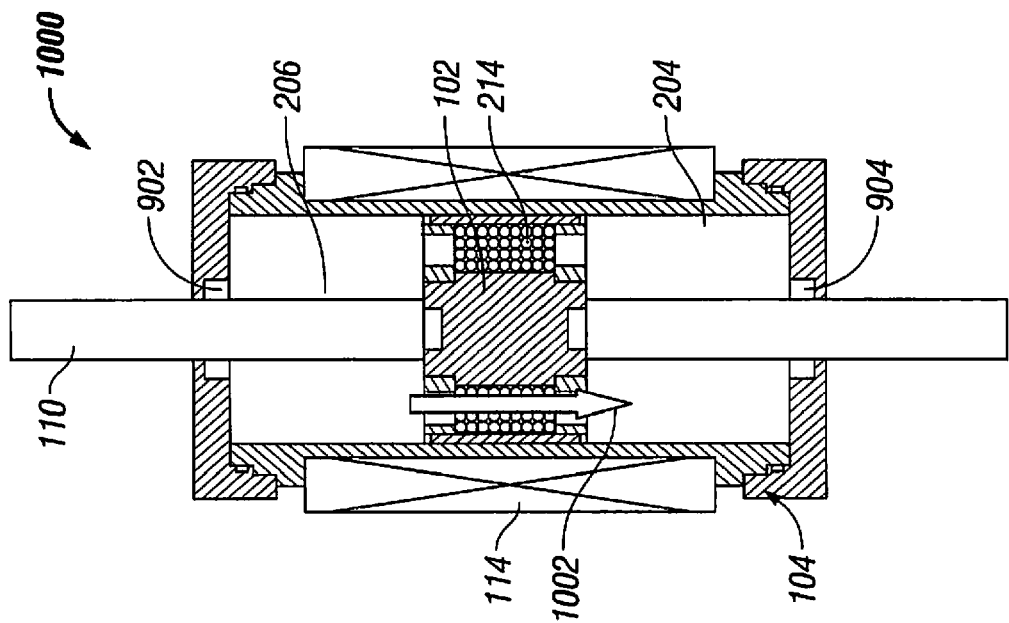
FIG. 10 is a cross-sectional view of an MR fluid damping system with an MR fluid pathway disposed within a piston head in accordance with the present disclosure.

Referring to drawings, FIG. 10 is a cross-sectional view of an MR fluid damping system 1000 with an MR fluid pathway 1002 disposed within piston head 102. Hydraulic cylinder 104 includes piston head 102 defines chambers 204 and 206. Piston rod 110 goes through piston head 102 and is connected to it, thus mitigating the need for a diaphragm. U-cups 902 and 904 are shown and may be standard hydrocarbon fluid seals compatible with MR fluids. Piston head 102 may include a nonmagnetic center column to support cover plates and connect with piston rod 110. Also piston head 102 may include piston cover plates to hold porous media 214. Magnetic coil 114 is disposed around hydraulic cylinder 104 such that porous media 214 and piston rod 110 function as a center magnetic flux path. Hydraulic cylinder 104 may include non-magnetic stainless steel in order to encourage the magnetic field to be stronger in MR fluid pathway 1002 rather than in hydraulic cylinder 104.

When piston head 102 moves relative to hydraulic cylinder 104, piston head 102 pushes MR fluid through MR fluid pathway 1002, e.g., when the MR fluid passes through porous media 214 the presence of a magnetic field affects the movement of piston head 102. The MR fluid may flow between chamber 204 and 206 via MR fluid pathway 1002.

Figure 11:
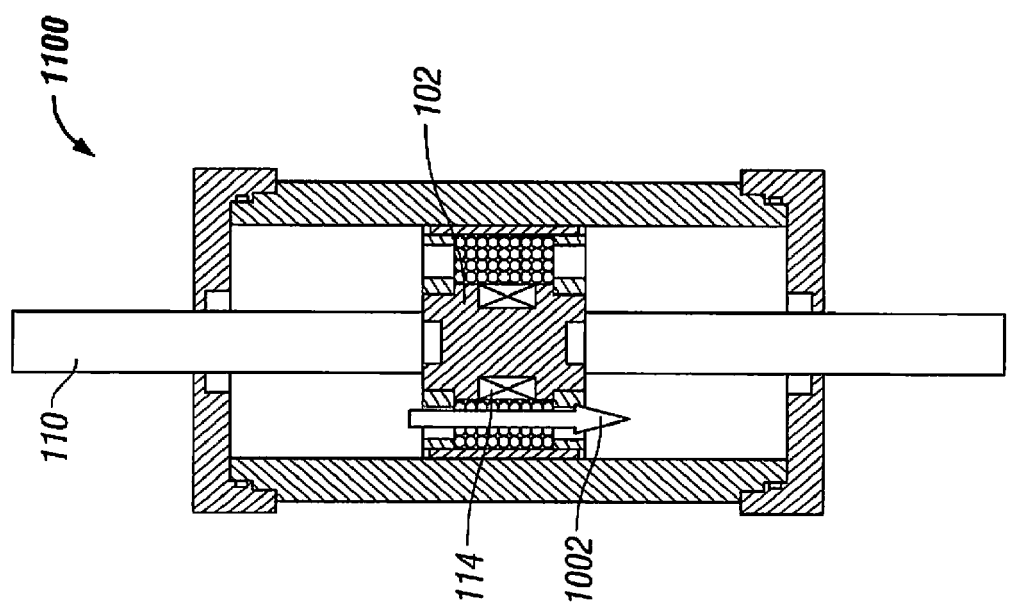
FIG. 11 is a cross-sectional view of an MR fluid damping system with an MR fluid pathway and a magnetic coil disposed within a piston head in accordance with the present disclosure.

Referring to the drawings, FIG. 11 shows a cross-sectional view of MR fluid damping system 1100 with an MR fluid pathway and magnetic coil 114 disposed within a piston head. Piston rod 110 and/or piston head 102 may be non-magnetic to focus the magnetic field within MR fluid pathway 1002 and consequently porous media 214. MR fluid damping system 1100 is similar to MR fluid damping system 1000 depicted in FIG. 10, however, the magnetic coil 114 is disposed within piston head 102 in MR fluid damping system 1100.

Figure 12:
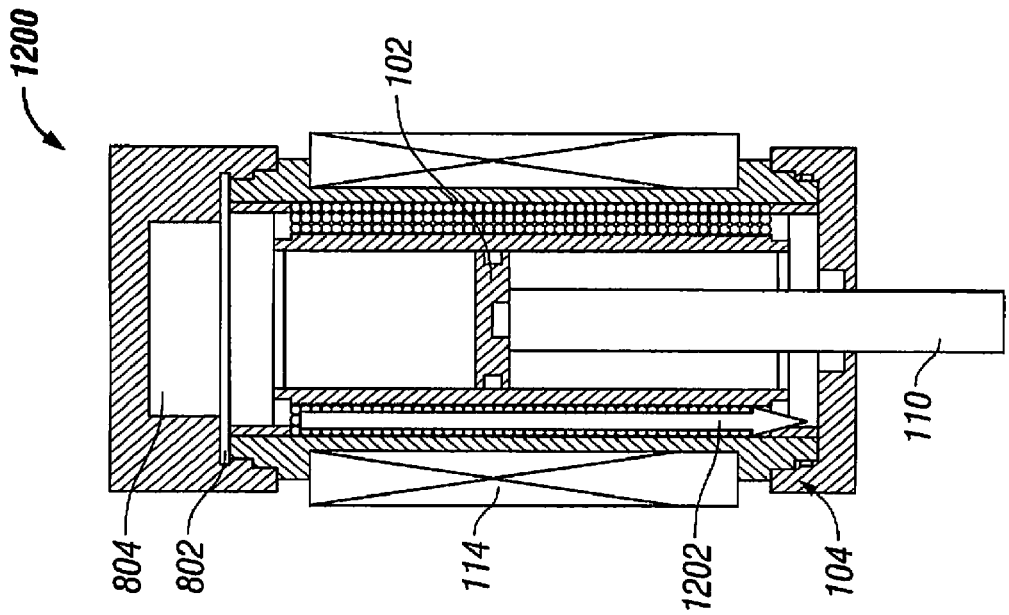
FIG. 12 is a cross-sectional view of an MR fluid damping system with a hydraulic cylinder, an MR fluid pathway is partially disposed on the inner wall of the hydraulic cylinder and a magnetic coil is disposed around the hydraulic cylinder in accordance with the present disclosure.

FIG. 12 is a cross-sectional view of an MR fluid damping system 1200 with a hydraulic cylinder 104. MR fluid pathway 1202 is partially disposed on the inner wall of the hydraulic cylinder 104. Note that diaphragm 802 is shown and forms accumulator 804 because piston rod 110 only enters hydraulic cylinder on one side and is attached to piston head 102 though going through piston head 102. Also, magnetic coil 114 is disposed around hydraulic cylinder 104.

Figure 13:
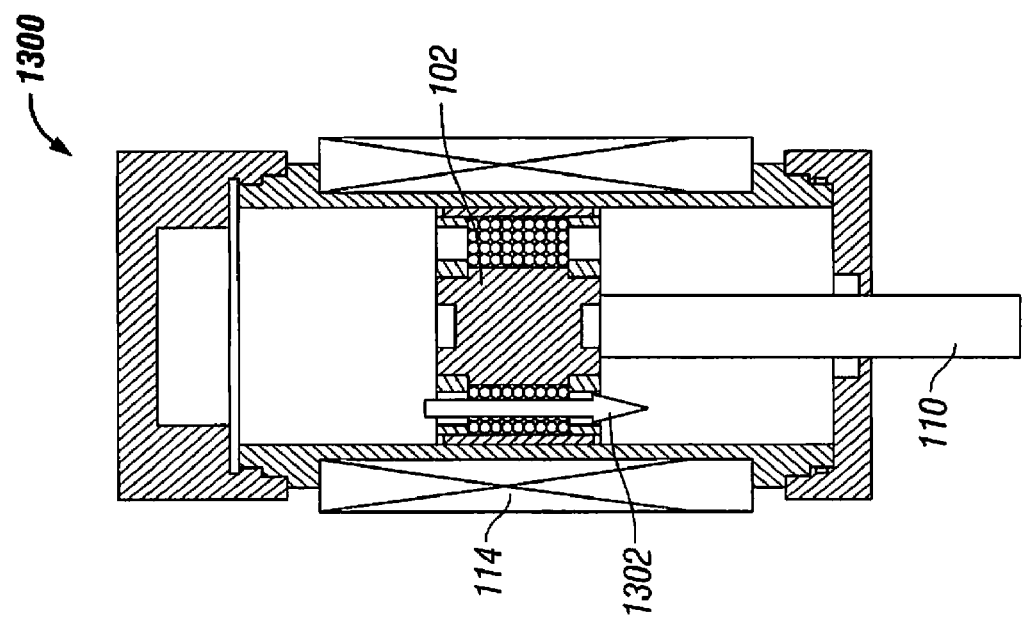
FIG. 13 is cross-sectional view of an MR fluid damping system with a hydraulic cylinder, an MR fluid pathway is partially disposed within the piston head and a magnetic coil is disposed around the hydraulic cylinder, in accordance with the present disclosure.

Referring to the drawings, FIG. 13 shows cross-sectional view of an MR fluid damping system 1300 with a hydraulic cylinder 104 with MR fluid pathway 1302 within piston head 102. Also, note that MR fluid pathway 1302 is disposed within piston head 102 and magnetic coil 114 is disposed around hydraulic cylinder 104. Since piston rod 110 enter into one end of hydraulic cylinder 104 to attach to piston head 102, diaphragm 802 is provided to form accumulator 804.

Figure 14:
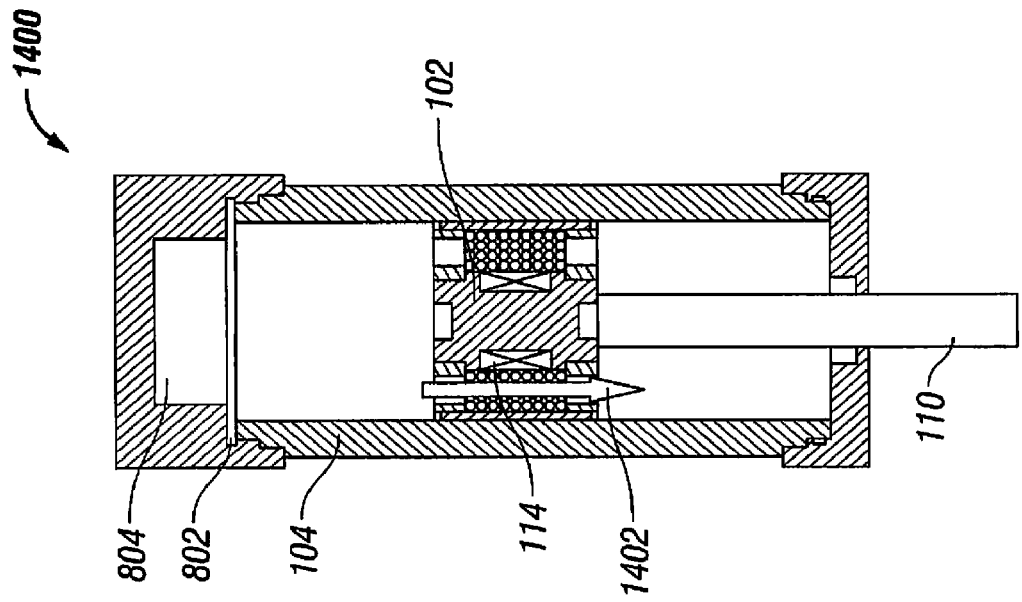
FIG. 14 is a cross-sectional view of an MR fluid damping system with a hydraulic cylinder and a piston head, the MR fluid pathway and the magnetic coil are disposed within the piston head and the hydraulic cylinder has a diaphragm forming an accumulator, in accordance with the present disclosure.

FIG. 14 is a cross-sectional view of an MR fluid damping system 1400 with a hydraulic cylinder 104 and a piston head 102 disposed therein. MR fluid pathway 1402 is position through piston head 102. Also, in this particular embodiment, diagram 802 forms accumulator 804 and may be needed because piston rod 110 is connected into piston head 102 on one side. Also note that magnetic coil 114 is disposed within piston head 102 as well.

Referring now simultaneously to FIGS. 15-18, that show representative test data obtained from an example use of FIG. 6. Consider the following example of FIG. 6: Hydraulic cylinder 104 may be using commercially available hydraulic cylinder with a 50.8 mm (2 inch) bore and a 152.4 mm (6 inch) stroke. Bypass porous value 202 may be fabricated around tube 216 that is made of stainless steel tube with an inner diameter of 10 mm. Non-magnetic stainless steel may be used to encourage the field to be stronger in the MR fluid rather than in the walls of tube 216. Tube 216 may be filled with magnetic media 216 that includes magnetic steel spheres of 3.5 mm diameter. Magnetic coil 114 may have 50 ohms of resistance and may be wrapped around the outside of tube 216. The ends of the porous bypass valve 202 may be welded to hydraulic cylinder 104 via machined steel end parts forming fluid connections 208 and 210. A ball valve may also be attached for filling system 600 with MR fluid. To evaluate the performance of the damper, measurements of damper response under steady-state sinusoidal displacements were taken using an 8 kN scotch yoke damper dynamometer and a 25 kN load frame with a servo-hydraulic actuator. The results are discussed infra.

Figure 15:
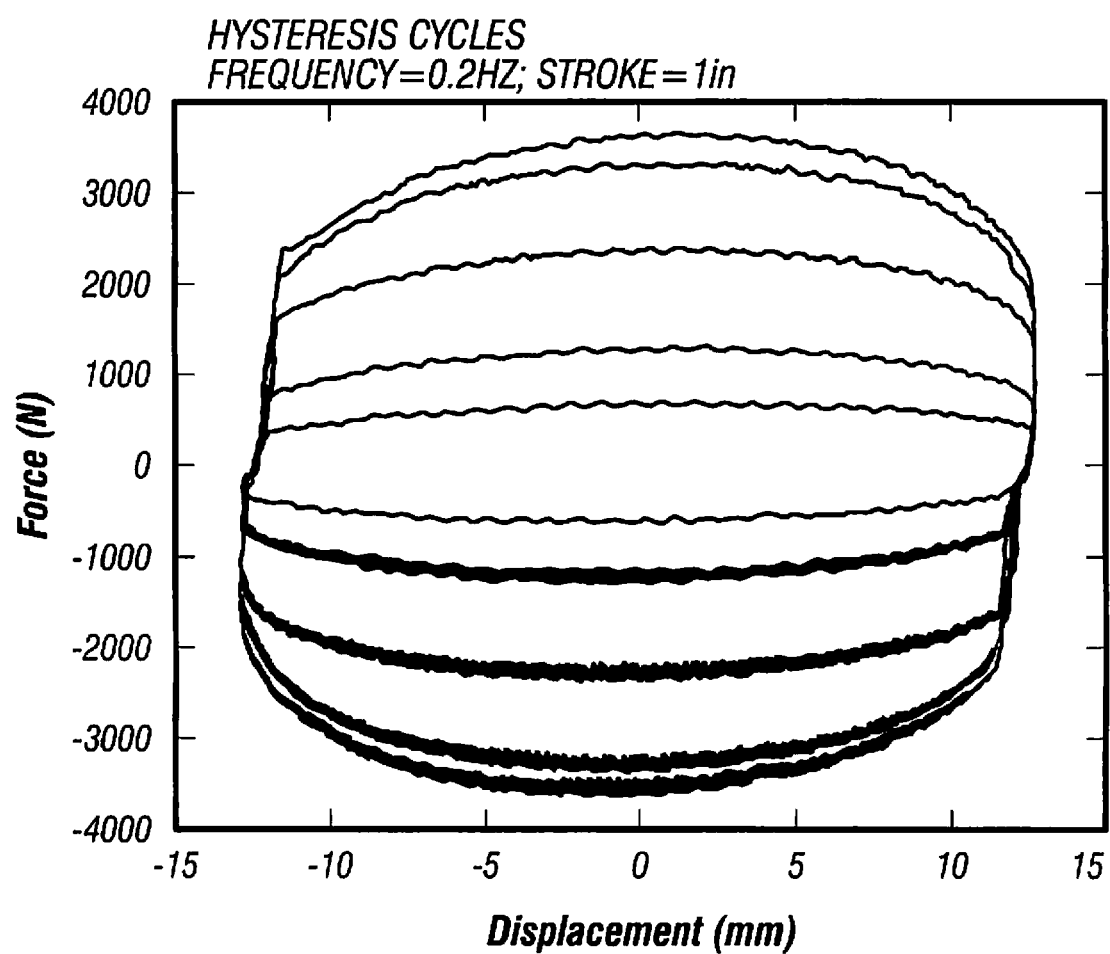
FIG. 15 is a graphic of hysteresis cycles with respect to displacement demonstrated by the embodiment shown in FIG. 6 with an applied electric current from approximately 0 to 1.5 Amps generating a magnetic field in accordance with the present disclosure.
Figure 16:
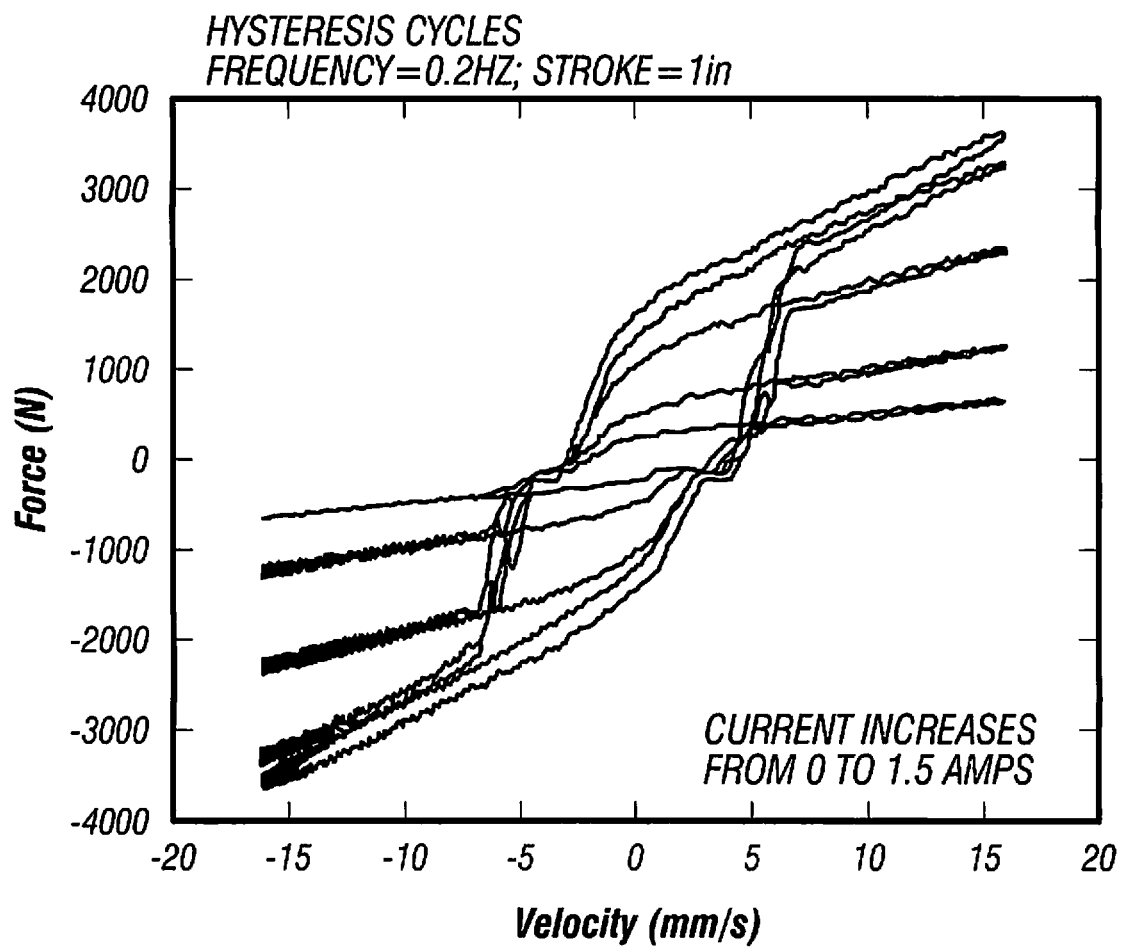
FIG. 16 is a graphic of hysteresis cycles with respect to velocity demonstrated by the embodiment shown in FIG. 6 with an applied electric current from approximately 0 to 1.5 Amps generating a magnetic field in accordance with the present disclosure.
Figure 17:
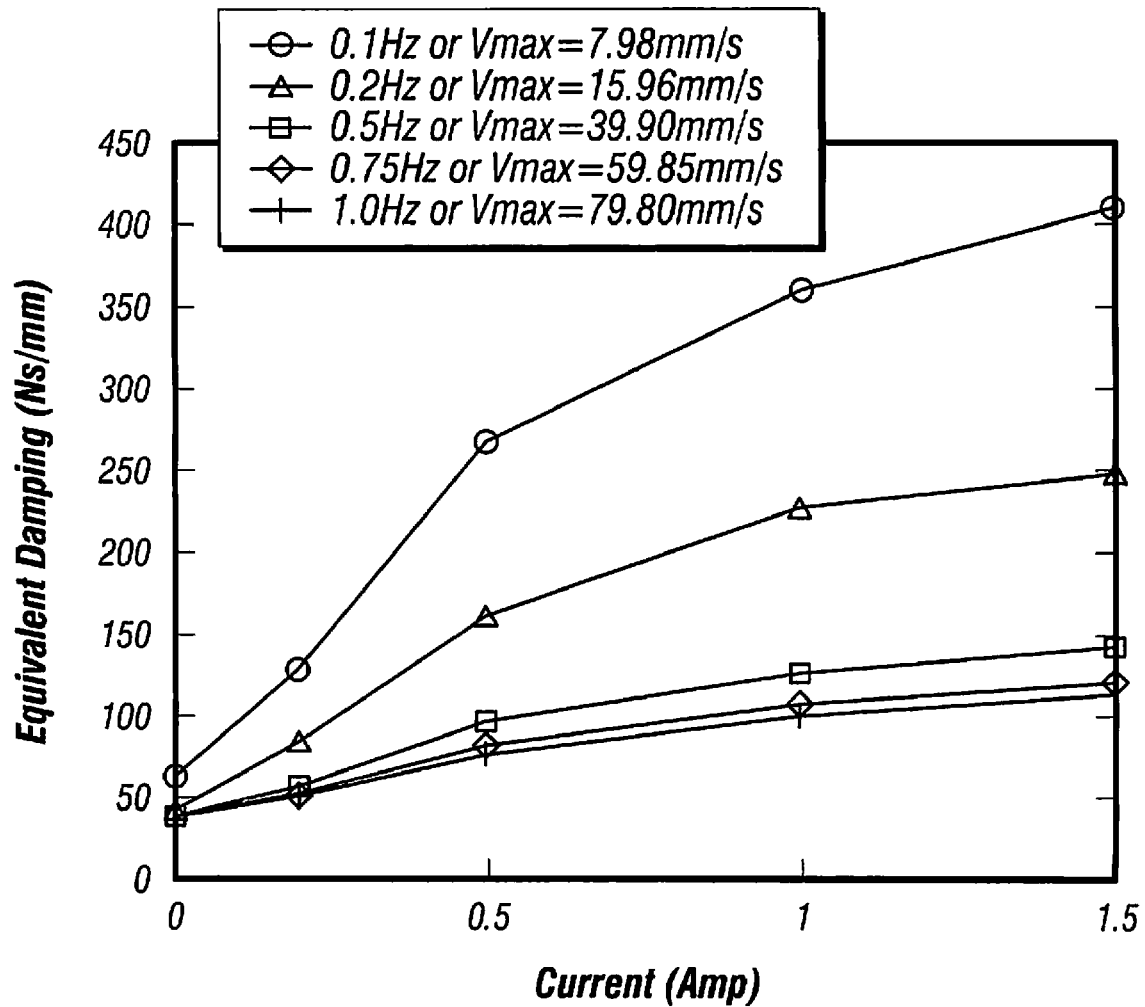
FIG. 17 is a graphical view of controllable equivalent damping with respect to applied frequency (damper velocity) demonstrated by the embodiment shown in FIG. 6, in accordance with the present disclosure.

FIG. 15 shows the force vs. piston displacement behavior of an exemplary MR fluid damping system 600, and FIG. 16 shows the force vs. piston velocity behavior of an exemplary MR fluid damping system 600. The total energy dissipated by an exemplary damping system 600 is represented by the area within the hysteresis cycles on the force vs. displacement plot in FIG. 15. As a current is increased (and consequently the magnetic field increases as well), more energy is dissipated by an exemplary MR fluid damping system 600. At a certain displacement and frequency, the dynamic force range of exemplary MR fluid damping system 600, shown in FIG. 16, is about six, which is much higher than some prior art MR dampers. The detailed relationship between the controllable damping and the applied current is shown in FIG. 17, wherein the equivalent damping coefficient is obtained by equating the energy dissipated per cycle for the exemplary MR fluid damping system 600 to an equivalent viscous damper. As can be seen, the applied magnetic field changes (from 0 to 1.5 Amps of supplied electric current), so does the equivalent viscous damping coefficient of the exemplary MR fluid damping system 600 dramatically increase. Compared with the zero field case, the maximum increase of the equivalent damping coefficient is eight times as the excitation frequency is 0.1 Hz (corresponding to the maximum velocity 7.98 mm/s). As the frequency increases, the equivalent damping coefficient of the exemplary MR fluid damping system 600 decreases. The minimum increase of the damping is two times as the frequency is 1 Hz (corresponding to the maximum velocity 79.8 mm/s). Similar results can be shown as the displacement amplitude increases while the frequency is kept a constant. In other words, the damping control range is a function of the applied velocity. It is demonstrated that the performance of the MR damper behaves as a combination of viscous and friction damper. However, the distinction between an MR damper with a porous valve and the damper with a conventional flow mode valve is that not only the friction or yield force but the viscosity of the porous valve damper is a function of an applied field. Thus, when using an MR damper system with exemplary bypass porous valve 202, the damping control range can be still kept in a required objective in a larger velocity range, which is favorable for a damper in high speed or shock resistance applications.

Figure 18:
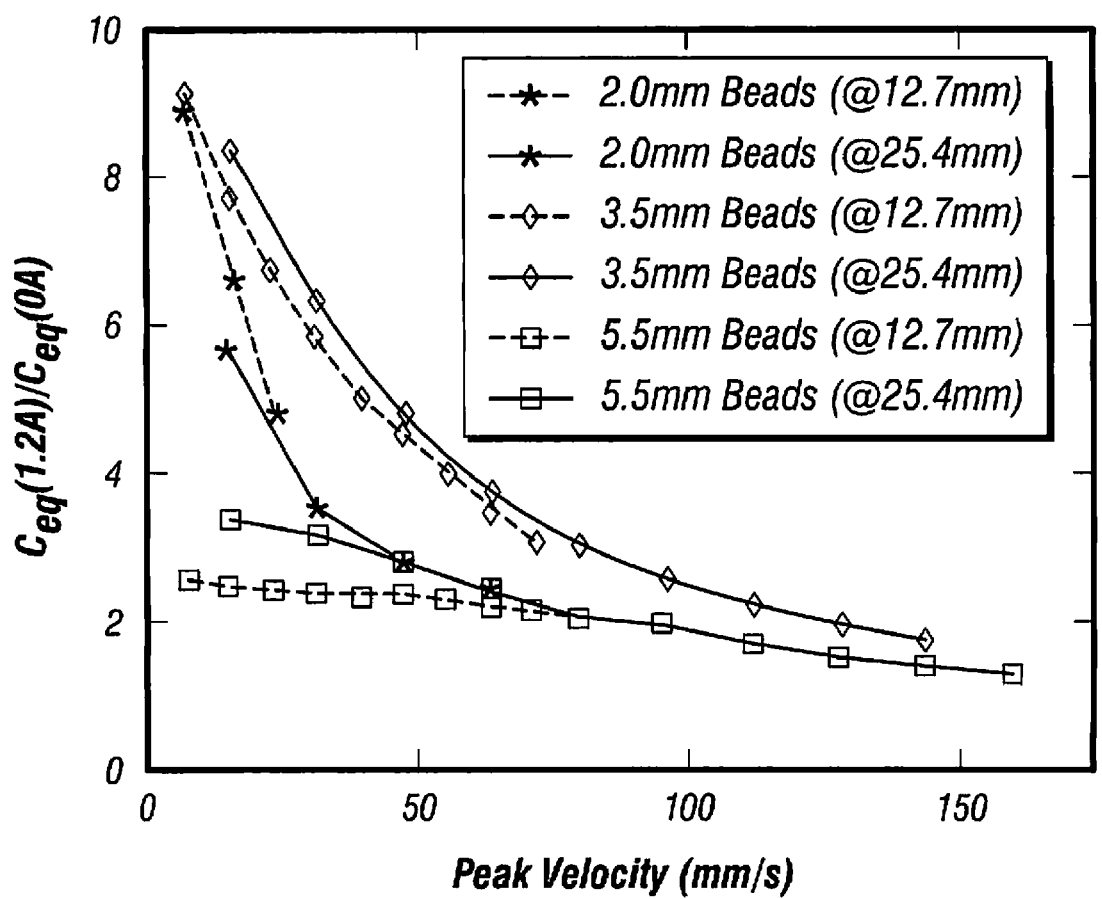
FIG. 18 is a graphical view of controllable damping ratio with respect to different bead size demonstrated by the embodiment shown in FIG. 6, in accordance with the present disclosure.

FIG. 18 is used to evaluate performance of the MR damping system 600 as a function of sphere bead size (2.0 mm, 3.5 mm, and 5.5 mm in diameter). Controllable damping range is a key performance metric for an MR damper, so that the non-dimensional damping coefficient (ratio of equivalent damping at 1.2 A to damping at 0 A) for three different bead sizes (2.0 mm, 3.5 mm and 5.5 mm ) is compared in FIG. 18. The peak velocity is the product of excitation amplitude and frequency for each testing case. To maximize the controllable damping range, on-state damping (Ceq at 1.2A) should be maximized, and off-state damping minimized (Ceq at 0A). The damping coefficient for the 3.5 mm case is largest because off-state damping for the 2 mm case is largest, which implies an optimized bead size for maximizing damping coefficient. In addition, the damping coefficient is a function of the peak velocity (dependent on amplitudes and frequencies), and the damping coefficient decreases as the peak velocity increases.

Accordingly, it will be understood that various modifications may be made to the embodiments disclosed herein, and that the above descriptions should not be construed as limiting, but merely as illustrative of various embodiments. Those skilled in the art will envision other modifications within the scope and spirit of the claims appended hereto.

What we claim is:

1. A magnetorheological fluid damping system, comprising:
   a hydraulic cylinder configured for at least partially disposing magnetorheological fluid therein, wherein the hydraulic cylinder includes first and second ends;
   a piston head disposed within the hydraulic cylinder, the piston head having first and second sides, wherein the piston head defines first and second chambers within the hydraulic cylinder, the first chamber being adjacent to the first side of the piston head, the second chamber being adjacent to the second side of the piston head, wherein the piston head is configured to be in sliding engagement with the hydraulic cylinder;
   a piston rod at least partially disposed within the hydraulic cylinder through the first side of the hydraulic cylinder, wherein the piston rod is operatively connected to the piston head on the first side; and
   a porous valve including at least one magnetorheological fluid pathway, wherein the porous valve includes first and second fluid connections, wherein the porous valve is configured to dampen the flow of the magnetorheological fluid between the first and second fluid connections in accordance with a magnetic field, wherein the first fluid connection is fluidly connected to the first chamber and the second fluid connection is fluidly connected to the second chamber, wherein the first fluid connection forms an internally threaded region configured to receive a hollow screw for securing at least one washer to a mesh, wherein the at least one magnetorheological fluid pathway is configured to at least partially direct the magnetorheological fluid flow through a porous media.

2. The system according to claim 1, the system further comprising:
   a diaphragm disposed in the hydraulic cylinder forming an accumulator.

3. The system according to claim 1, wherein the at least one magnetorheological fluid pathway comprises a nonmagnetic tube configured for at least partially disposing the porous media therein.

4. The system according to claim 1, wherein the porous media includes at least one of spherical beads, cylindrical columns, irregular cylinders, irregular columns, arrays of hollow cylinders, straight geometry arrays of hollow cylinders, circuitous geometry arrays of hollow cylinders, flakes, irregular shapes, flat plates with holes aligned perpendicular to the flow of the magnetorheological fluid, open cell foams, cellular structures, lattice structures, fibers, a columnar array, carbon nanofibers, carbon tubes, and a shape memory alloy.

5. The system according to claim 1, wherein the porous media is nonmetallic.

6. The system according to claim 1, where the porous media is metallic.

7. The system according to claim 1, the system further comprising:
   a magnetic coil configured to generate the magnetic field at least partially through the porous media.

8. The system according to claim 1, wherein the porous valve is a bypass porous valve.

9. The system according to claim 1, wherein the at least one magnetorheological fluid pathway is at least partially disposed within the piston head.

10. A porous valve comprising:
    a magnetorheological fluid pathway comprising a tube configured for at least partially disposing a porous media therein, wherein the tube defines first and second ends;
    a magnetic coil forming an approximate cylinder shape, wherein the tube is at least partially disposed within the magnetic coil; and
    a first fluid connection operatively secured to the first end of the tube, wherein the first fluid connection forms an internally threaded region configured to receive a hollow screw for securing at least one washer to a mesh.

11. The valve according to claim 10, wherein the washer is a nylon washer.

12. The valve according to claim 10, wherein the hollow screw is a hollow set hex screw.

13. The valve according to claim 10, wherein the tube is a nonmagnetic tube.

14. The valve according to claim 10, the porous media comprising:
    a plurality of nonmagnetic stainless steel spheres or magnetic steel spheres.

15. The valve according to claim 10, wherein the magnetic coil is a copper magnetic coil.

16. The valve according to claim 10, the valve further comprising:
    a current source operatively connected to the magnetic coil, wherein the current source supplies electric current to the magnetic coil to generate a magnetic field.

17. A method for dampening mechanical vibrations comprising:
    providing a magnetorheological fluid damping system, the magnetorheological fluid damping system comprising:
       a hydraulic cylinder configured for at least partially disposing magnetorheological fluid therein, wherein the hydraulic cylinder includes first and second ends;
       a piston head disposed within the hydraulic cylinder, the piston head having first and second sides, wherein the piston head defines first and second chambers within the hydraulic cylinder, the first chamber being adjacent to the first side of the piston head, the second chamber being adjacent to the second side of the piston head, wherein the piston head is configured to be in sliding engagement with the hydraulic cylinder;
       a piston rod at least partially disposed within the hydraulic cylinder through the first side of the hydraulic cylinder, wherein the piston rod is operatively connected to the piston head on the first side; and
       a porous valve including at least one magnetorheological fluid pathway, wherein the porous valve includes first and second fluid connections, wherein the porous valve is configured to dampen the flow of the magnetorheological fluid between the first and second fluid connections in accordance with a magnetic field, wherein the first fluid connection is fluidly connected to the first chamber and the second fluid connection is fluidly connected to the second chamber, wherein the first fluid connection forms an internally threaded region configured to receive a hollow screw for securing at least one washer to a mesh, wherein the at least one magnetorheological fluid pathway is configured to at least partially direct the magnetorheological fluid flow through a porous media; and
    adjusting the magnetic field for dampening mechanical vibrations.

18. The method according to claim 17, wherein the step of adjusting the magnetic field for dampening mechanical vibrations further comprises:
    varying a load-stroke profile of the magnetorheological fluid damping system when the mechanical vibrations includes at least one of a shock loads and a short duration impulsive load.

19. A method for controlling a porous valve comprising:
providing a porous valve comprising:
a magnetorheological fluid pathway comprising a tube having a first fluid connection, wherein the magnetorheological fluid pathway is configured for at least partially disposing a porous media therein, wherein the first fluid connection forms an internally threaded region configured to receive a hollow screw for securing at least one washer to a mesh; and
a magnetic coil forming an approximate cylinder shape, wherein the tube is at least partially disposed within the magnetic coil; and
controlling a current source operatively connected to the magnetic coil, wherein the current source supplies electric current to the magnetic coil to generate a magnetic field.

20. A porous valve comprising:
a chamber configured for at least partially disposing a magnetorheological porous media therein;
a coil configured to generate a magnetic field, wherein the coil is disposed in spaced relation to the chamber to generate the magnetic field at least partially through the chamber;
a fluid connection fluidly connected to the chamber and forming an internally threaded region;
a mesh disposed within the internally threaded region;
a screw having threads configured to engage with the internally threaded region, wherein the screw is adapted to secure the mesh within the internally threaded region; and
a washer disposed within the internally threaded region, wherein the screw is further adapted to secure the washer and mesh within the internally threaded region.

21. The porous valve according to claim 20, wherein the washer is a nylon washer.

22. The porous valve according to claim 20, further comprising another washer disposed within the internally threaded region, wherein the screw is further adapted to secure both washers within the internally threaded region.

23. The porous valve according to claim 20, wherein the screw is a hollow screw.

24. The porous valve according to claim 20, wherein the screw is a hollow set hex screw.

25. The porous valve according to claim 20, wherein the mesh is a steel mesh.

26. The porous valve according to claim 20, wherein the internally threaded region is configured to receive the screw to secure the magnetorheological porous media at least within the chamber by the mesh.

27. The porous valve according to claim 20, further comprising a tube having an inner volume defining the chamber.

28. The porous valve according to claim 27, wherein the coil is at least partially disposed around the tube.

29. The system according to claim 20, wherein the porous media includes at least one of spherical beads, cylindrical columns, irregular cylinders, irregular columns, arrays of hollow cylinders, straight geometry arrays of hollow cylinders, circuitous geometry arrays of hollow cylinders, flakes, irregular shapes, flat plates with holes aligned perpendicular to the flow of the magnetorheological fluid, open cell foams, cellular structures, lattice structures, fibers, a columnar array, carbon nanofibers, carbon tubes, and a shape memory alloy.

30. A valve comprising:
a tube defining an internal cavity and having an end;
a magnetorheological porous media disposed within the tube;
a connection coupled to the end of the tube and defining an internally threaded region;
a mesh disposed within the internally threaded region and adapted to secure the magnetorheological porous media within at least the tube;
a first washer;
a second washer; and
a screw configured to mate with the internally threaded region thereby securing the mesh between the first and second washers and within the internally threaded region.

31. The valve according to claim 30, further comprising:
a screw configured to mate with the internally threaded region and secure the mesh within the internally threaded region.

32. The valve according to claim 30, further comprising a coil at least partially disposed around the internal cavity.

33. The valve according to claim 30 wherein, the magnetorheological porous media is beads.

34. The valve according to claim 33, wherein the beads has a diameter of one of about 2 mm, about 3.5 mm, and about 5.5 mm.

35. The valve according to claim 34, wherein the beads are nonmagnetic steel beads.

36. The valve according to claim 34, wherein the beads are magnetic steel beads.

37. The valve according to claim 30, wherein the magnetorheological porous media is a porous media means for tortuously affecting the flow of magnetorheological fluid within the tube.

38. A magnetorheological fluid damping system, comprising:
a hydraulic cylinder configured for at least partially disposing magnetorheological fluid therein, the hydraulic cylinder having an inner surface and an outer surface;
a piston head disposed within the hydraulic cylinder, the piston head having first and second sides, wherein the piston head defines first and second chambers within the inner surface of the hydraulic cylinder, the first chamber being adjacent to the first side of the piston head, the second chamber being adjacent to the second side of the piston head, wherein the piston head is configured to be in sliding engagement with the inner surface of the hydraulic cylinder;
a piston rod at least partially disposed within the hydraulic cylinder through a first end of the hydraulic cylinder, wherein the piston rod is operatively connected to the piston head on the first side; and
at least one magnetorheological fluid pathway defined between the inner and outer surfaces of the hydraulic cylinder, the fluid pathway defining first and second fluid connections, wherein the first fluid connection is fluidly connected to the first chamber of the hydraulic cylinder and the second fluid connection is fluidly connected to the second chamber of the hydraulic cylinder, wherein the first fluid connection forms an internally threaded region configured to receive a screw for securing at least one washer to a mesh; and
a magnetorheological porous media disposed within the at least one magnetorheological fluid pathway.

39. The fluid damping system according to claim 38, wherein the magnetorheological porous media is a porous media means for tortuously affecting the flow of magnetorheological fluid within the magnetorheological fluid pathway.

40. A method of damping, comprising:

providing a magnetorheological fluid damping system, comprising:

a hydraulic cylinder configured for at least partially disposing magnetorheological fluid therein, the hydraulic cylinder having an inner surface and an outer surface;

a piston head disposed within the hydraulic cylinder, the piston head having first and second sides, wherein the piston head defines first and second chambers within the inner surface of the hydraulic cylinder, the first chamber being adjacent to the first side of the piston head, the second chamber being adjacent to the second side of the piston head, wherein the piston head is configured to be in sliding engagement with the inner surface of the hydraulic cylinder;

a piston rod at least partially disposed within the hydraulic cylinder through a first end of the hydraulic cylinder, wherein the piston rod is operatively connected to the piston head on the first side; and at least one magnetorheological fluid pathway defined between the inner and outer surfaces of the hydraulic cylinder, the fluid pathway defining first and second fluid connections, wherein the first fluid connection is fluidly connected to the first chamber of the hydraulic cylinder and the second fluid connection is fluidly connected to the second chamber of the hydraulic cylinder, wherein the first fluid connection forms an internally threaded region configured to receive a screw for securing at least one washer to a mesh; and a magnetorheological porous media disposed within the at least one magnetorheological fluid pathway; and enabling the magnetorheological fluid to flow through the at least one magnetorheological fluid pathway.

41. The method according to claim 40, further comprising applying a magnetic field to the magnetorheological porous media thereby dampening the movement of the piston head.

\* \* \* \* \*